April 5, 1966       W. B. NOLAND       3,244,192
VALVE ASSEMBLY FOR A HYDRANT
Filed May 19, 1965       2 Sheets-Sheet 1
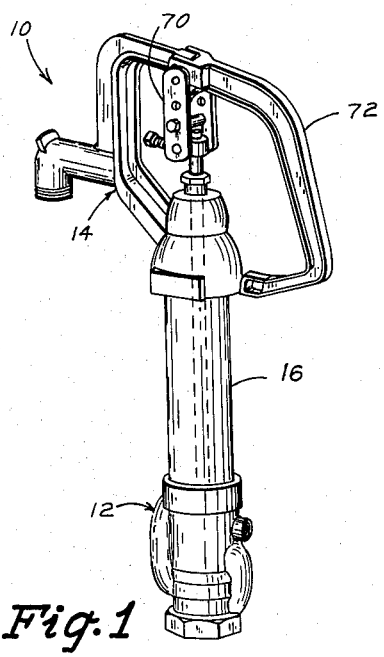
Fig. 1
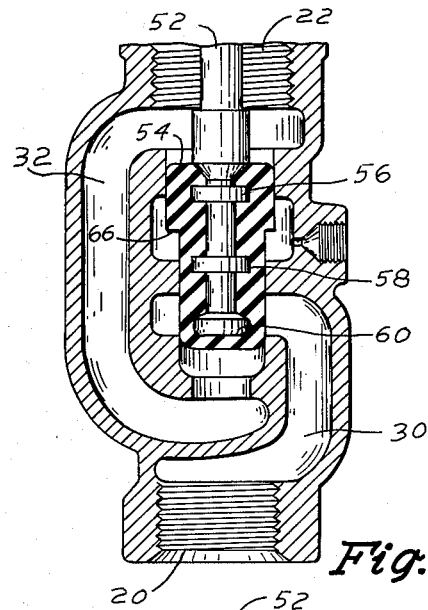
Fig. 3
Fig. 4
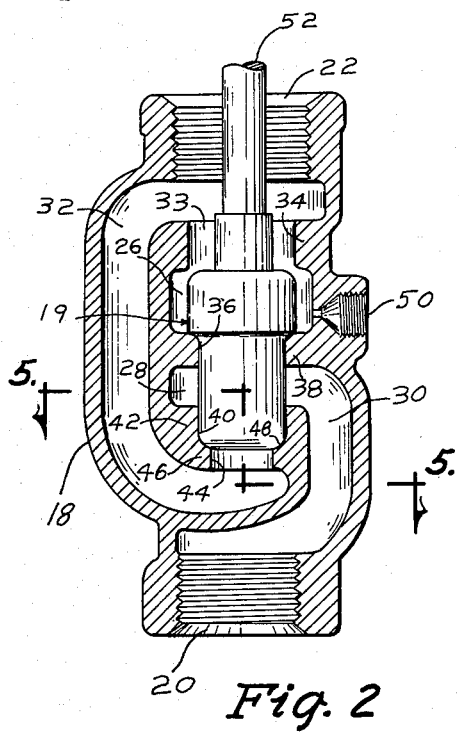
Fig. 2
Fig. 5
INVENTOR
WAYNE B. NOLAND
BY
Dick, Zarley & Henderson
ATTORNEYS April 5, 1966

W. B. NOLAND 3,244,192

VALVE ASSEMBLY FOR A HYDRANT

Filed May 19, 1965

INVENTOR
WAYNE B. NOLAND
BY Dick, Zarley + Henderson
ATTORNEYS

United States Patent Office 3,244,192
Patented Apr. 5, 1966

3,244,192
VALVE ASSEMBLY FOR A HYDRANT
Wayne B. Noland, Avon Lake, Iowa, assignor to Woodford Manufacturing Company, Des Moines, Iowa, a corporation of Iowa
Filed May 19, 1965, Ser. No. 458,836
7 Claims. (Cl. 137—302)

This application is a continuation-in-part of application, Serial No. 303,365 filed August 20, 1963, now abandoned, on a Valve Assembly for a Hydrant.

This invention relates to a non-freezeable hydrant and in particular to its valve assembly.

It is one of the objects of this invention to provide a non-freezeable ground hydrant having a valve structure employing a valve seat, which will remain in a semi-balanced state in all valve positions between fully opened and closed.

Another related object of this invention is to provide a valve assembly in which the valve is unaffected by inlet pressures when in its closed position and therefore will not be inadvertently opened.

A specific object of this invention is to provide a valve assembly having a valve body capable of altering the direction of the flow through the body such that all inlet pressure on the valve member is at an angle of 90° to the line of axial movement of the valve member when in a closed condition.

A still further object of this invention is to provide a valve assembly having a valve member which will seat in a valve body seat to give a maximum of sealing but at the same time cause a minimum of frictional resistance to the opening of said valve member.

It is another object of this invention to provide a non-freezeable ground hydrant having a valve assembly which is self-draining when the hydrant is closed.

Another object of this invention is to provide a valve assembly having a valve seat designed to last indefinitely.

It is another object of this invention to provide a valve structure having a valve body which serves as a guide for the valve seat.

A further object of this invention is to provide a valve assembly for a hydrant which is simple in design, economical to manufacture and refined in appearance.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

FIG. 1 is a perspective view of the complete non-freezeable ground hydrant unit;

FIG. 2 is a longitudinal sectional view through the valve assembly illustrating in particular the valve seat in a closed position within the valve body;

FIG. 3 is a sectional view through the valve assembly and valve seat or plunger with the valve seat in a partially raised position;

FIG. 4 is a sectional view through the valve assembly showing the valve seat or plunger in an open position;

Figures 6, 7:
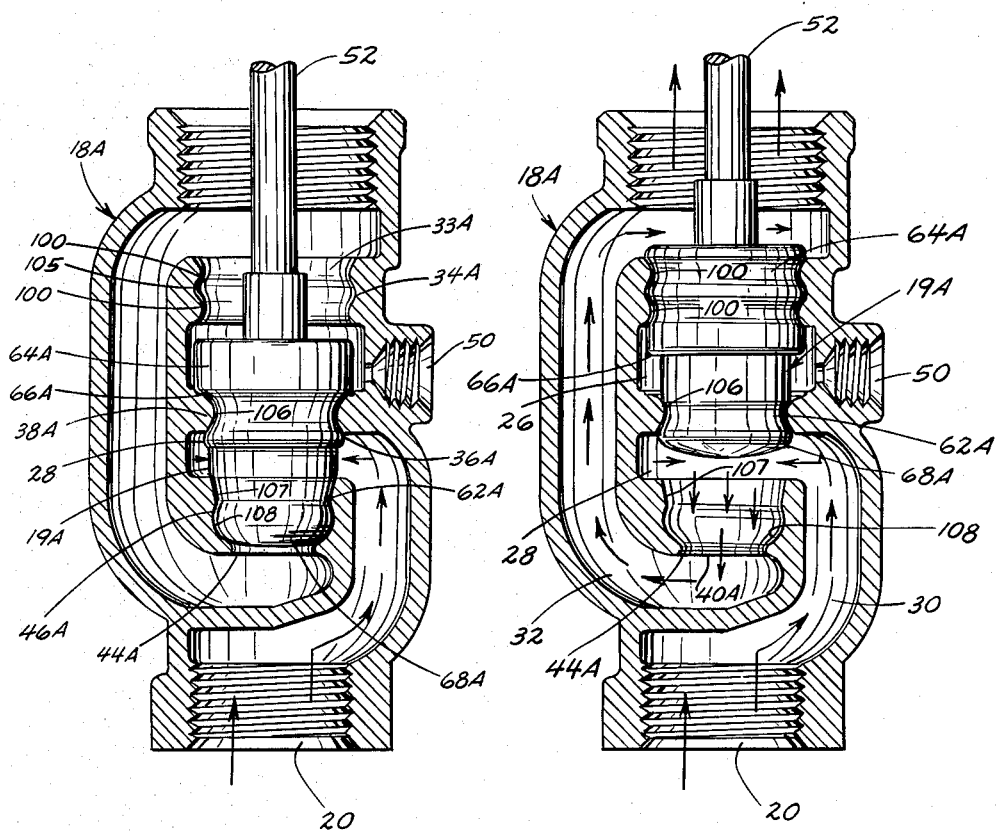

FIG. 5 is a transverse cross-sectional view along line 5—5 in FIG. 2 of the valve assembly; and FIGS. 6 and 7 are cross-sectional views similar to FIGS. 2 and 4 respectively but illustrating another embodiment of the valve body and in particular the structure for sealing the valve member in the valve body. Additionally, these figures illustrate the travel path of the liquid through the valve body and the direction of the pressure forces in the valve body and on the valve member.

In FIG. 1 of the drawings the non-freezeable ground hydrant is referred to generally by the reference numeral 10. It basically comprises a valve assembly 12 and a hydrant head 14 positioned at opposite ends of a riser pipe 16.

The valve assembly 12 includes an elongated valve body 18 and a valve seat or plunger valve member 19. The body 18 has an inlet opening 20 at one end and an outlet opening 22 at the other end with a chamber 24 (FIG. 5) therebetween and in alignment therewith. The chamber 24 comprises annular outlet and inlet compartments (FIG. 4) 26 and 28 respectively. A passageway 30 extends between the inlet compartment 28 at the side thereof and the inlet opening 20. A second passageway 32 is connected to the bottom of the inlet compartment and communicates with the outlet opening 32 at the top of the valve body 18.

The outlet chamber 26 has a top opening 33 formed by an annular shoulder 34 and a lower aligned opening 36 formed by an annular shoulder 38. The opening 36 and shoulder 38 are common to both compartments 26 and 28. The lower compartment 28 has a lower end opening 40 formed by an annular wall portion 42 which is contiguous with a smaller opening 44 formed by a wall portion 46 integral with the wall 42. The opening 44 is in direct communication at the bottom end of the compartment 28 with the passageway 32 communicating with the outlet opening 22. At the junction between the wall portions 42 and 44 an annular concave shoulder 48 is formed. The diameter of the openings 36 and 40 are equal while the diameter of the opening 33 is relatively larger.

At the bottom of the upper compartment 26 is in the sidewall, a drain opening 50 is provided which places the compartment 26 in communication with the outside of the valve body 18.

The plunger or valve seat 19 includes a valve stem 52 having a rubber valve seat 19 includes a valve stem 52 having a rubber valve seat element 54 secured on one end thereof by a trio of annular flanges 56, 58 and 60, which are embedded in the rubber seat element. The seal element 54 has a first portion 62 (FIG. 4) corresponding in diameter to the openings 36 and 40 and a second portion 64 integral with the first portion but having a diameter corresponding to the opening 33. An annular shoulder 66 is formed at the junction between the two portions 62 and 64. The lower end of the second portion 64 is provided with a convex peripheral edge 68 to matingly engage the concave shoulder 48 formed in the compartment 28. The plunger or seat element 19 is of such a length that as shown in FIG. 3 it may be so positioned to close off each of the openings 33, 36 and 40.

The upper end of the valve stem 52 is connected to a linkage member 70 (FIG. 1) which is pivotally connected to a valve actuating lever 72 in turn hinged to the hydrant head 14.

It is to be understood that ordinarily the valve assembly 12 will be placed in the ground just below the frost line. Accordingly the length of the riser pipe 16 connecting the valve assembly 12 to the hydrant head 14 will vary according to the conditions of use.

In FIGS. 6 and 7 a modified embodiment of this invention is shown and structure similar to that of FIGS. 2 and 4 is referred to by the same reference numeral.

The valve body 18A includes the three coaxial annular shoulders 34A, 38A and 46A which define openings 33A, 36A and 40A respectively. Between the annular shoulders 34A and 38A the enlarged compartment 26 is provided and similarly between the shoulders 38A and 46A is an annular compartment 28.

The valve member plunger 19A is of the same construction as that shown in FIGS. 2 and 3 but being made of rubber or the like is deformed to conform to the curvature of the shoulders 34A, 38A and 46A. The annular shoulder 34A is defined by a pair of convex annular shoulder portions 100 on opposite sides of a concave annular recess 105. The annular shoulder 38A has a convex surface 106. The lower annular shoulder 46A is defined by a shoulder portion 107 which tapers inwardly from the annular compartment 28 and merges into an annular concave recess 108.

Thus it is seen that annular convex sealing surfaces have been used in lieu of the cylindrical surfaces shown in FIGS. 2 and 3 which define the openings 33, 36 and 40. The diameter of the crest of the convex shoulders 100 and 106 is smaller than the corresponding diameter of the openings 33 and 36 and therefore the convex shoulders 100 and 106 protrude farther into the resilient plunger 19A. It has been found however that although there is a tighter fit between the shoulders 34A, 38A and 46A, the sealing of the valve is superior and the force required to move the plunger 19A to its open position of FIG. 7 is less. In part, the reason for this is that the sealing action occurs along a line, the crest of the convex surfaces rather than over an elongated cylindrical surface such as that defining the opening 33 in FIG. 2.

Thus it is seen that in operation fluid may enter through the inlet opening 20 into the passageway 30 and move into the inlet compartment 28 along a line perpendicular to the axial movement of the valve seat plunger 19 or 19A as seen by the arrows in FIGS. 6 and 7. It will be appreciated that the axial forces on the plunger 19 and 19A when the valve is in an open position, such as shown in FIG. 4, will be negligible since the fluid will pass through the aligned openings 40, 40A and 44 and 44A into the passageway 32 and out the outlet opening 22. From the outlet opening 22 it will move up through the riser pipes 16 and be dispensed through the hydrant head 14. Referring again to FIG. 4 it is noted that when the plunger 19 is in its open position the opening 33 is closed by the portion 64 or 64A thereby preventing fluid from entering the compartment 26 and escaping through the drain opening 50. Conversely, when the plunger 19 or 19A is in its closed position, as shown in FIGS. 2 and 6, compartment 28 is closed off and compartment 26 is open to receive fluid from the riser pipe 16 which will be permitted to escape around the plunger portion 64 or 64A and out the drain opening 50. Consequently, the hydrant unit 10 will not be subject to freezing since the only fluid remaining therein will be in the passageway 32 which is below the freeze line.

It should be appreciated that the plunger 19 and 19A maintain a sealed relationship between the compartments 26 and 28 at all times. Not only do the plunger portions 62 and 62A seal the compartments, but also when the plungers 19 and 19A are in closed positions, as shown in FIGS. 2 and 6, the shoulders 66 and 66A bear against the peripheral edge of the openings 36 and 36A to insure a positive seal betwen the compartments. Similarly, communication between compartment 28 and the passageway 32 is prevented by two sealing surfaces carried by the plungers 19 and 19A. First, the cylindrical sidewall of the plunger portions 62 and 62A matingly engage the inner peripheral edge of the wall 42 and the concave surface 108 (FIG. 6). Secondly, when the plungers 19 and 19A are in their closed positions the lower convex peripheral edges 68 and 68A of the plunger portions 62 and 62A seat in mating engagement with the peripheral concave shoulders 48 and 108.

In particular, it is to be appreciated that as is clearly illustrated in FIGS. 6 and 7, the inlet water pressure which normally would tend to push the plunger toward an open position is instead diverted from the opening 20 in the valve body members 18 and 18A around to the side where the pressure forces are at 90° to the line of movement of the plungers 19 and 19A and therefore the valve plunger member is unaffected by the inlet water pressures particularly when in its closed condition as shown in FIGS. 2 and 6. Accordingly, accidental or inadvertent opening of the valve will never be caused by the inlet pressures on the valve plungers 19 and 19A.

Some changes may be made in the construction and arrangement of my Valve Assembly for a Hydrant without departing from the real spirit and purpose of my invention, and it is my intention to cover by my claims, any modified forms of structure or use of mechanical equivalents which may be reasonably included within their scope.

I claim:

1. In a valve assembly, a valve body having inlet and outlet openings, a chamber formed in said valve body, said chamber having a pair of compartments formed therein, one of said compartments having openings in opposite ends in alignment with each other and with said outlet opening, said opening remote from said outlet opening being common to and communicating with said second compartment; a first passageway separate from said chamber in communication with said second compartment and said outlet opening and a second passageway in communication with said second compartment and said inlet opening, and said first compartment having a drain means communicating directly with the outside of said valve assembly; and a plunger member adapted to move axially within said first compartment from an open position to a closed position, in said open position said plunger extending the axial length of said first compartment and closing off said openings in said first compartment and said first and second passageways being in communication with each other through said second compartment, and in said closed position said opening in said first compartment adjacent said outlet opening being open for communication with said drain means, and said other opening in said first compartment adapted to communicate with said second compartment being closed by said plunger, said plunger in its closed position also closing off the openings of said first and second passageways into said second compartment thereby closing said valve and permitting fluid in said first compartment to be discharged from said valve by said drain means, the flow from said second pasageway into said second compartment is in a direction perpendicular to the line of axial movement of said plunger and at a point intermediate the openings of said second compartment whereby the fluid emitted from said second passageway has no affect on the axial movement of said plunger towards closed and open positions.

2. In a valve assembly, a valve body having inlet and outlet openings, a chamber formed in said valve body, said chamber having a pair of compartments formed therein, one of said compartments having openings in opposite ends in alignment with each other and with said outlet opening, said opening remote from said outlet opening being common to and communicating with said second compartment; a first passageway separate from said chamber in communication with said second compartment and said outlet opening and a second passageway in communication with said second compartment and said inlet opening, and said first compartment having a drain means communicating directly with the outside of said valve assembly; and a plunger member adapted to move axially within said first compartment from an open position to a closed position, in said open position said plunger extending the axial length of said first compartment and closing off said openings in said first compartment and said first and second passageways being in communication with each other through said second compartment, and in said closed position said opening in said first compartment adjacent said outlet opening being open for communication with said drain means, and said other opening in said first compartment adapted to communicate with said second compartment being closed by said plunger, said plunger in its closed position also closing off the openings of said first and second passageways into said second compartment thereby closing said valve and permitting fluid in said first compartment to be discharged from said valve by said drain means, the flow from said second passageway into said second compartment is in a direction perpendicular to the line of axial movement of said plunger and at a point intermediate the openings of said second compartment whereby the fluid emitted from said second passageway has no affect on the axial movement of said plunger towards closed and open positions and said first passageway is further defined as communicating with said second compartment at said opening opposite the opening common to said first and second compartments and at a point spaced from the point said second passageway communicates with said second compartment.

3. In a valve assembly,
a valve body having openings at opposite ends thereof,
a chamber formed in said valve body and having a plurality of spaced apart coaxial annular shoulders defining a passageway through said chamber in communication with said end openings,
said plurality of shoulders including first and second shoulders defining a compartment therebetween,
the inner edge of each of said first and second annular shoulders including an annular convex shoulder portion, and
a plunger movably disposed in said chamber in sealing engagement with said annular convex shoulder portions, said plunger being of resilient material and adapted to be depressed in the area of engagement by said annular convex shoulders,
said plurality of spaced apart co-axial annular shoulders includes three annular shoulders, the third shoulder being at one end of said chamber and being defined as having an inwardly tapering surface extending towards said one end and adapted to sealingly engage said plunger,
said first shoulder being disposed at the opposite end of said chamber and said second shoulder between the opposite ends of said chamber, and
said plunger adapted to continuously engage said second shoulder and adapted to be moved to said one end of said chamber for sealing engagement with said third shoulder and to said opposite end of said chamber for sealing engagement with said first shoulder.

4. In a valve assembly,
a valve body having openings at opposite ends thereof,
a chamber formed in said valve body and having a plurality of spaced apart coaxial annular shoulders defining a passageway through said chamber, in cooperation with said end openings,
said plurality of shoulders including first and second shoulders defining a compartment therebetween, and a third shoulder at the opposite end from said first shoulder cooperating with said second shoulder to define a second compartment,
the inner edge of each of said first and second annular shoulders including an annular convex shoulder portion, and
a plunger movably disposed in said chamber in continuous sealing engagement with said second annular convex shoulder portions, said plunger being of resilient material and adapted to be depressed in the area of engagement by said annular convex shoulders, said plunger adapted to be moved to a first position in sealing engagement with said first shoulder and to a second position in sealing engagement with said third shoulder.
an inlet opening being in communication with said one of said chambers and having a center axis extending substantially perpendicularly to the line of axial movement of said plunger.

5. The structure of claim 3 wherein said first annular shoulder inner edge portion includes a plurality of annular convex shoulder portions.

6. The structure of claim 3 wherein said first annular shoulder inner edge portion includes a plurality of annular convex shoulder portions and a concave annular recess between adjacent convex shoulder portions.

7. The structure of claim 3 wherein said tapering surface merging into an annular concave surface which in turn merges into a transversely inwardly extending annular shoulder portion which is adapted to limit travel of said plunger in said chamber.

References Cited by the Examiner
UNITED STATES PATENTS

| | | | |
|---|---|---|---|
| 303,554 | 8/1884 | Becker | 137—625.27 |
| 1,320,944 | 11/1919 | Thoens | 251—324 X |
| 2,124,155 | 7/1938 | Thaete | 251—333 X |
| 2,665,710 | 1/1954 | McGarry et al. | 137—302 X |
| 2,770,443 | 11/1956 | Rand | 251—333 |

MARTIN P. SCHWADRON, *Primary Examiner.*